R. VUILLEUMIER.
METHOD AND APPARATUS FOR INDUCING HEAT CHANGES.
APPLICATION FILED JAN. 29, 1917.

1,275,507.

Patented Aug. 13, 1918.
3 SHEETS—SHEET 1.

Inventor
Rudolph Vuilleumier.
By Mauro, Cameron, Lewis & Massie
Attorneys

R. VUILLEUMIER.
METHOD AND APPARATUS FOR INDUCING HEAT CHANGES.
APPLICATION FILED JAN. 29, 1917.
1,275,507.
Patented Aug. 13, 1918.
3 SHEETS—SHEET 2.
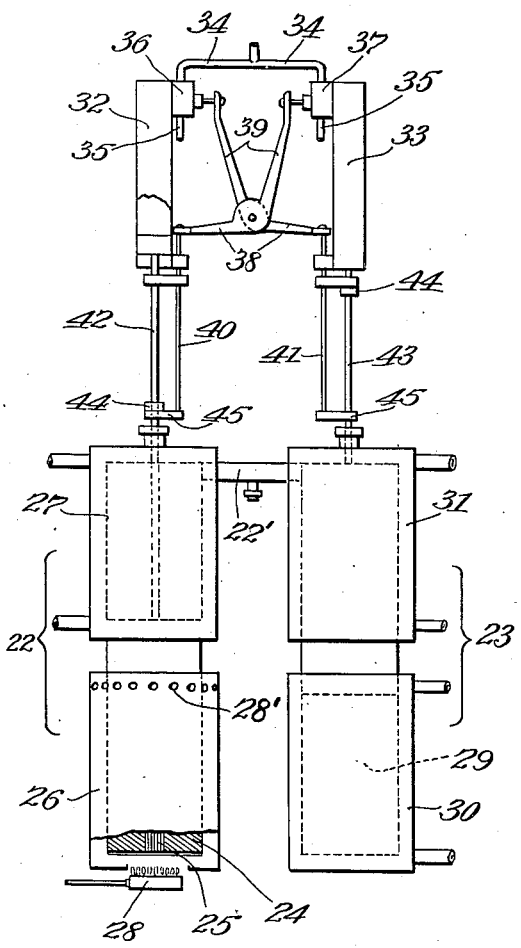
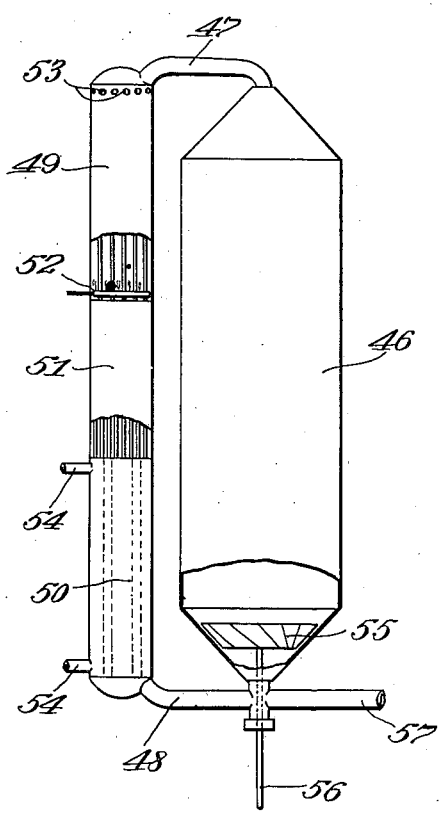
Inventor
Rudolph Vuilleumier
By Mauro, Cameron, Lewis & Massie
Attorneys

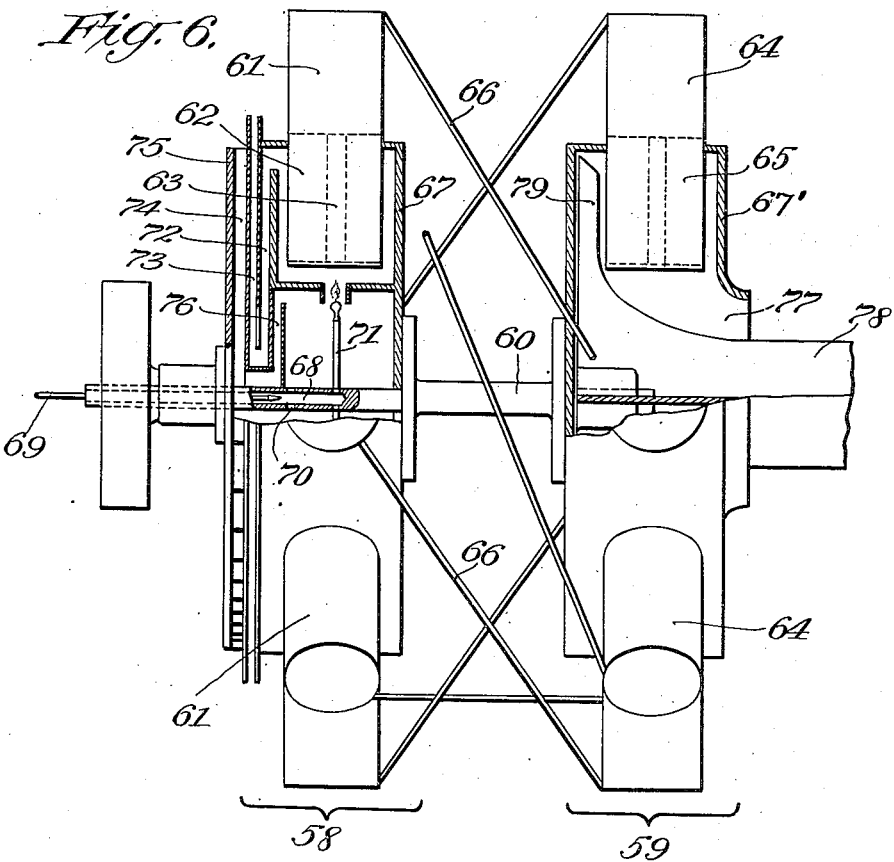
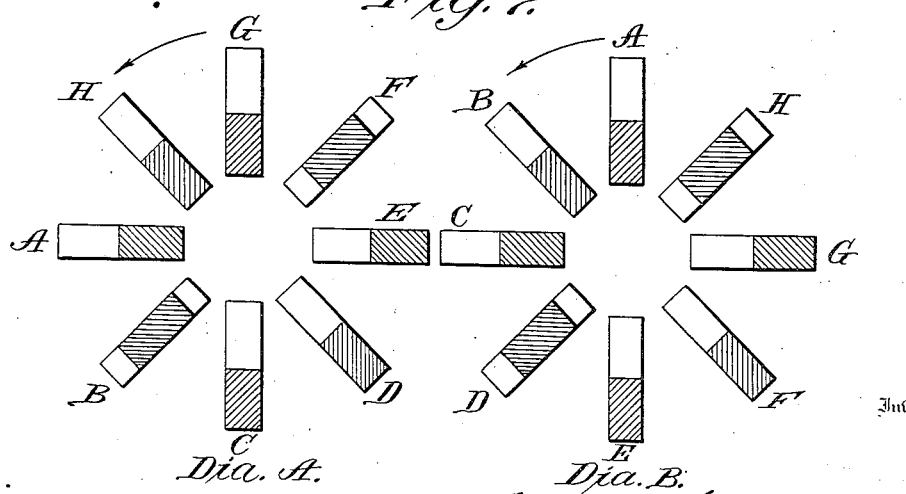

UNITED STATES PATENT OFFICE.

RUDOLPH VUILLEUMIER, OF NEW ROCHELLE, NEW YORK.

METHOD AND APPARATUS FOR INDUCING HEAT CHANGES.

1,275,507.     Specification of Letters Patent.     Patented Aug. 13, 1918.

Application filed January 29, 1917. Serial No. 145,252.

*To all whom it may concern:*

Be it known that I, RUDOLPH VUILLEUMIER, a citizen of the United States of America, and a resident of New Rochelle, New York, have invented a new and useful Improvement in Methods and Apparatus for Inducing Heat Changes, which invention is fully set forth in the following specification.

This invention relates to a method and apparatus for inducing heat-changes.

When a fluid, such as air, is heated under conditions admitting a change of volume, it performs a definite amount of work in expanding against the external pressure thereon, which work, in the case of air, is approximately .069 B. T. U.'s per degree Fahrenheit per pound of air heated, when expressed in its heat equivalent. This quantity is generally called the dynamic specific heat of air, and it represents the difference between the specific heat of air at constant pressure (approximately .238) and the specific heat of air at constant volume (approximately .169), in which latter case no work is done upon increase of temperature. (These three specific heats will hereafter be referred to as $S_p$ for the specific heat at constant pressure, $S_v$ for the specific heat at constant volume, and $(S_p - S_v)$ for the dynamic specific heat). Therefore, as air is heated or cooled under constant pressure, out of every .238 B. T. U.'s of heat applied or abstracted, .169 B. T. U.'s are actually imparted to or removed from the air as sensible heat, while the remaining .069 B. T. U.'s are employed in performing positive or negative work in expanding against or in contracting under the constant pressure.

It is an object of this invention to utilize this heat, expended in doing positive or negative work upon expansion or contraction of a fluid under an absolute pressure, to secure secondary heating or cooling effects.

A further object of this invention is to provide a method and apparatus whereby primary heat changes may be productive of secondary heat changes of different quantity or degree.

A still further object of this invention is to provide a method and apparatus whereby, by heating or cooling a body of fluid, expansion or contraction thereof will induce in a second body of fluid in pressure-interchanging relation therewith heating or cooling effects which may be confined and abstracted. Thereby a relatively cool medium or body, which is brought into contact with a body of fluid of a still lower temperature and thereby raises the temperature of the latter by primary heating, may induce secondary heating in a second body of fluid of a higher temperature; or conversely, a relatively warm medium or body, which is brought into contact with a body of fluid of a still higher temperature and lowers the temperature of the latter by primary cooling, may induce secondary cooling in a second body of fluid of a lower temperature.

Stated broadly, the invention comprises a method of producing primary heat changes in a fluid, preferably by subjecting a body of fluid alternately to sources of different temperature (and thereby alternating the pressure and thus generating induced or secondary temperature-effects in the fluid), and abstracting the secondary heating or cooling effects induced thereby, preferably by alternately subjecting a second body of fluid in pressure-interchanging relation with said first body of fluid to and depriving it of heat-interchanging relation with a medium capable of abstracting said heating or cooling effects. More specifically, such subjecting of said portions of fluid to the temperature-effects, is conveniently attained by transferring said portions, or causing them to move, to and fro between sources of different temperatures, preferably through suitable regenerators. The invention furthermore comprises, in its broad aspect, means for subjecting a fluid to primary heat changes, preferably in the form of means to displace said fluid through a regenerator alternately between sources of different temperature, and means to abstract the secondary heating or cooling effects induced thereby, preferably in the form of means to displace fluid in pressure-interchanging relation with said first-mentioned fluid through a regenerator alternately into and out of heat-interchanging relation with a medium capable of abstracting said heating or cooling effects.

The method of this invention is capable of being carried out in a variety of apparatus, several forms of which are shown diagrammatically on the accompanying drawings, but it is to be expressly understood that such drawings are for purposes of illustration only, and are not to be construed as definitions of the limits of the invention, reference being had to the appended claims for that purpose.

In said drawings, wherein the same reference characters indicate corresponding parts in the several figures, Figure 1 illustrates diagrammatically an elemental apparatus for inducing secondary heat changes;

Fig. 4 is a diagrammatic view of a modified apparatus for carrying out the present invention;

Fig. 5 diagrammatically illustrates a portion of a still further modified apparatus whereby the present invention may be practised;

Fig. 6 illustrates in somewhat greater detail yet a fourth form of apparatus; and Fig. 7 is a diagram of the positions assumed by the pistons in the apparatus of Fig. 6.

If air within a container having an outlet to the atmosphere be heated, said air will absorb heat in accordance with the law of specific heat at constant pressure, owing to the constant pressure exerted thereon by the atmosphere, and the expansion of the air within the container, as the temperature thereof rises, will cause some of it to be forced out of the container against the prevailing atmospheric pressure, performing a definite amount of work in overcoming such pressure. The amount of this work performed, expressed in its heat equivalent, will be the difference between the specific heat of air at constant pressure and the specific heat of air at constant volume, i. e., $S_p - S_v$.

Figure 1:
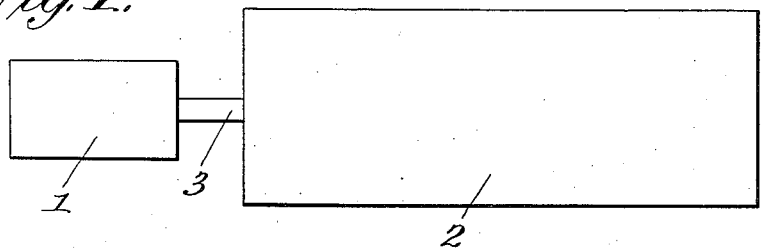

Referring to Fig. 1, two containers 1 and 2 of different volume are shown connected by a conduit 3. Let it be assumed that both of these containers, together with their connecting conduit, are filled with air at the same pressure and temperature. If the air in container 1 be heated, it will expand and a certain portion thereof will flow into container 2, increasing the pressure therein. This air flows from container 1 to container 2 against the pressure within the latter, and therefore must perform work in increasing the pressure within said container 2, which work will appear as a resultant secondary heating of the air in said latter container. If said container 2 be relatively large as compared with container 1, the amount of air passing from container 1 to container 2, and therefore the amount of work performed and the amount of secondary heat induced, will closely follow that performed and induced when air is heated within a container in communication with the atmosphere, i. e., the secondary heat induced will closely approximate $S_p - S_v$. As container 2 is made larger (or smaller) as respects container 1, the secondary heat change induced in the former will approach (or recede from) the theoretical dynamic specific heat of air. Similarly, by cooling the air within container 1, air will flow thereinto from container 2, with a decrease of pressure and consequent decrease of temperature within the latter, which cooling effect similarly will approximate quantitatively the dynamic specific heat of air as container 2 is made relatively larger as compared with container 1.

It will therefore be seen that by heating or cooling a fluid, such as air, within one of two (or more) inclosed communicating spaces, the amount of heat absorbed or abstracted may be made to closely follow the specific heat at constant pressure of said fluid, or its specific heat at constant volume, or any desired value between the two, by properly selecting the volume of the other space with which the first-mentioned space communicates; and that the heat imparted to or abstracted from the fluid in the first-mentioned space in excess of its specific heat at constant volume will reappear or disappear as sensible heat in the fluid in the other space in communication with said first-mentioned space, and therefore is capable of exerting heating or cooling effects upon a medium in heat-interchanging relation with the fluid in said second-mentioned space. Therefore, the more nearly the larger of the two spaces approximates in volume the sum of the volumes of the two spaces, the more nearly will the secondary heating or cooling effects in the larger space follow the value of the dynamic specific heat of such fluid. Furthermore, it will be observed that the secondary heating or cooling effects described will be induced in the same way, although the fluid in one of the containers be at a temperature materially above or materially below that of the fluid in the other container.

Figure 2:
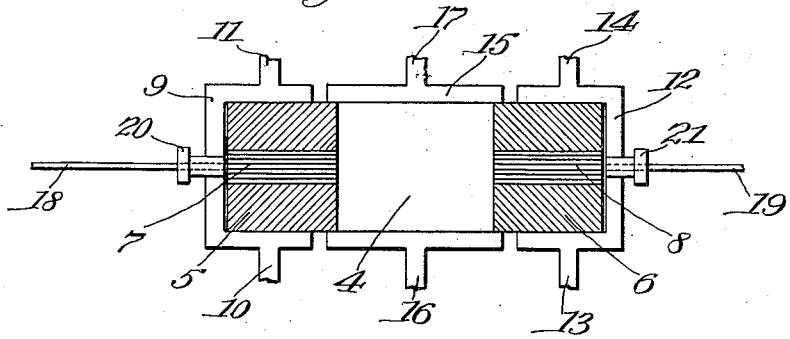
Fig. 2 illustrates diagrammatically an apparatus for inducing and abstracting secondary heat changes in accordance with the present invention.

Referring to Fig. 2, there is shown diagrammatically a simple apparatus whereby the induced secondary heating or cooling effects above described may be availed of. As here shown, 4 is a cylinder having walls of high conductivity, within which are located two easily movable pistons 5 and 6, made of material of low conductivity. Each of said pistons includes a heat regenerator. As shown, each of said pistons has a central boring provided with a large number of heat absorptive radial walls separated by passages of small cross section to constitute regenerators 7 and 8. Obviously any other suitable form of regenerator could be employed equally well, and, if desired, the passages of the regenerator could be distributed throughout the entire body of the piston instead of being grouped closely adjacent its axis. One end of the cylinder is surrounded by a heating jacket 9 having an inlet 10 and an outlet 11; the opposite end of the cylinder is provided with a refrigeration jacket 12, having an inlet 13 and an outlet 14; and the central section of the cylinder is provided with a cooling jacket 15 having an inlet 16 and an outlet 17. Said pistons 5 and 6 are provided with piston rods 18 and 19 which pass through packing boxes 20 and 21 in the ends of cylinder 4. The cylinder may be charged with any suitable fluid, such as air, at any desired pressure.

Figure 3:
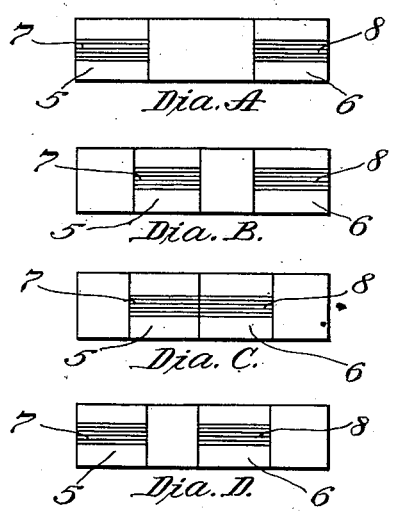
Fig. 3 is a diagram of the several positions assumed by the pistons in the apparatus of Fig. 2.

Assume, for the purpose of this illustration, that this apparatus is to be employed in inducing a moderately low temperature for refrigerating purposes, that the medium within the heating jacket 9 has a temperature of 1000° F. absolute, and that the media within the refrigeration and cooling jackets 12 and 15 have an initial temperature of 500° F. absolute. Throughout this specification, the temperatures specified are to be understood as absolute temperatures. It will be understood that the volume of the air passages in each of the regenerators is very small in comparison with the volume of the free spaces within the cylinder 4, and that the heat capacity of each regenerator is many times the heat capacity of the air within said cylinder. The diagrams marked A, B, C and D in Fig. 3 show the successive positions assumed by the pistons during a complete heat transforming cycle which is divided into four phases. During phase one, piston 5 moves from the position shown in diagram A to the position shown in diagram B. During this movement, part of the air in the space embraced by the cooling jacket 15 is displaced through regenerator 7 into the space embraced by the heating jacket 9, where, upon coming into contact with the heated walls thereof, its temperature is increased to 1000° F. This primary heating causes a secondary inductive heating of the air remaining in the cooling space, which heating effect is abstracted by the cooling medium in the cooling jacket. During the second phase, piston 6 moves from the position shown in diagram B to the position shown in diagram C. During this movement, the remaining air in the cooling space 15 is displaced through the regenerator 8 into the space embraced by the refrigeration jacket 12. As the latter space is initially at the same temperature as the cooling space, no change of temperature takes place in the air inclosed within said spaces. During the third phase, piston 5 returns from the position shown in diagram C to the position shown in diagram D. The air is thereby returned from the heating space through regenerator 7 to the cooling space, imparting its heat to said regenerator and arriving in the cooling space at a temperature of approximately 500° F. The primary cooling which the air undergoes in passing through regenerator 7 causes a secondary cooling effect to take place in the free spaces of the cylinder, chiefly in the refrigerating space. The reduction in pressure resulting from the cooling of the air in regenerator 7 during this phase is also accompanied by a pressure equalization throughout the system, which causes a slight flow of air from the refrigerating space to the cooling space and a resultant slight primary heating of the latter air as it flows through regenerator 8. A corresponding slight secondary heating consequently occurs in all of the free spaces of the cylinder, and this secondary heating offsets, to a slight degree, the secondary cooling effected in the refrigerating space by the primary cooling in regenerator 7. During the fourth phase, piston 6 returns from the position shown in diagram D to the position shown in diagram A, and the air in the refrigerating space is displaced through the regenerator 8 to the cooling space, absorbing a small amount of heat from said regenerator and causing a slight secondary heating in the free spaces of the cylinder.

The parts being now returned to initial position, the cycle is repeated continuously. During the succeeding cycle, the conditions prevailing will be substantially the same as those existing during the first cycle, except that the additional primary heat imparted to the regenerator 7 during the third phase will tend to build up a higher temperature gradient therein, while the secondary heat abstracted from the refrigerating space during the same phase will tend to reduce the temperature in the latter as well as the temperature of the medium in the refrigeration jacket; and during the fourth phase more heat will be abstracted from regenerator 8, lowering the average temperature therein or increasing the extent of the temperature gradient thereof. During the ensuing displacements of the air in cylinder 4, the delivery and abstraction of primary heat to and from said air takes place in the relatively small spaces of the regenerators 7 and 8. Inasmuch as the volume of the free spaces in the cylinder 4 is relatively large as compared with the volume of the spaces in the air-passages of the regenerators, the primary heat changes will closely follow the value of the specific heat of air at constant pressure, while the secondary induced heat changes or effects derived therefrom will closely follow the value of the dynamic specific heat of air. As the cycles are repeated, the temperature gradient built up in regenerator 7 approximates at its extremities the end temperatures of the heat differential existing between the heating jacket and the cooling jacket, while the temperature gradient built up in regenerator 8 closely approximates at its extremities the end temperatures of the heat differential existing between the refrigeration jacket and the cooling jacket, owing to the fact that the same weight of air travels through each regenerator periodically and alternately in opposite directions. Furthermore, the heat differential between the refrigeration and cooling jackets will be progressively or cumulatively increased in extent until the desired temperature is obtained at one end of said differential, for example, the desired low temperature is obtained in the refrigerating jacket 12, when the device is used for refrigerating purposes.

Assuming then that heat is being delivered to the air in the space embraced by the heating jacket 9 at 1000° F. absolute, that the cooling jacket maintains a temperature of 500° F. absolute, and that the desired temperature of 400° F. absolute has been reached in the refrigeration jacket, an analysis of the operating conditions is as follows:

*Phase one.*—Air is displaced from the cooling space through regenerator 7 to the heating space, receiving primary heat proportional to the temperature gradient through which it passes, i. e., $500 \times$ its weight $\times S_v$, while heat to the amount of $500 \times$ its weight $\times S_p$ is abstracted from regenerator 7. Consequently, secondary heat to the amount of substantially $500 \times$ its weight $\times (S_p - S_v)$ is induced in the free spaces of the cylinder in pressure-interchanging relation with the air passing through the regenerator. Most of this secondary heat goes to the cooling space where it is conducted to the walls and to the medium in the jacket surrounding said space. Some secondary heat is also induced in the heating space, which secondary heat reduces the amount of heat that must be abstracted from the heating medium to maintain the temperature in the heating jacket at the desired high value.

*Phase two.*—Air in passing through regenerator 8 from the cooling space to the refrigerating space gives up an amount of primary heat proportional to the temperature gradient through which it passes, i. e., $100 \times$ its weight $\times S_v$, while an amount of heat equal to $100 \times$ its weight $\times S_p$ is imparted to said regenerator. Consequently, an amount of secondary heat equal to $100 \times$ its weight $\times (S_p - S_v)$ is abstracted from the free space within the cylinder, chiefly from the heating space. Furthermore, on account of the reduction in pressure arising from the reduction in temperature in the cooling space, a small amount of air flows from the heating space through regenerator 7 into the cooling space to equalize the pressure, and such flow is accompanied by a corresponding primary cooling of this air whereby heat to the amount of $500 \times$ the weight of this air $\times S_p$ is imparted to regenerator 7, and secondary cooling to the amount of $500 \times$ the weight of this air $\times (S_p - S_v)$ takes place in the free spaces, chiefly in the heating space.

*Phase three.*—Air in passing through regenerator 7 from the heating space to the cooling space gives up an amount of primary heat proportional to the temperature gradient through which it passes, i. e., $500 \times$ its weight $\times S_v$, while an amount of heat equal to $500 \times$ its weight $\times S_p$ is imparted to regenerator 7. Consequently, a secondary heating effect equal to $500 \times$ its weight $\times (S_p - S_v)$ is induced in the free spaces, chiefly in the refrigerating space. On account of the lowering of the pressure which follows the temperature decrease in the cooling space, some of the air from the refrigerating space flows through the regenerator 8 to secure pressure equalization. This air undergoes primary heating in regenerator 8 to an amount equal to $100 \times$ the weight of this air $\times S_v$, while a secondary heating effect is induced in the free spaces of the cylinder equal to $100 \times$ the weight of this air $\times (S_p - S_v)$. This secondary heating effect occurs chiefly in the refrigerating space and slightly offsets the cooling effect induced during phase two.

*Phase four.*—Air in passing through regenerator 8 receives primary heat proportional to the temperature gradient through which it passes, i. e., $100 \times$ its weight $\times S_v$, while regenerator 8 gives up an amount of primary heat equal to $100 \times$ its weight $\times S_p$. Consequently, secondary heating equal to $100 \times$ its weight $\times (S_p - S_v)$ takes place in the free spaces, chiefly in the cooling space.

From the foregoing it will be noted that inasmuch as the weight of fluid passing through each of the regenerators is the same in either direction, the heating of each regenerator is offset by the cooling which follows, and vice versa. Under normal working conditions, therefore, the regenerators simply produce primary heat changes of equal but opposite value in alternation, inducing the secondary heating and cooling effects. Heat is thus absorbed from the heating space and imparted at a lower temperature to the cooling space, while heat is abstracted from the refrigerating space and imparted at a higher temperature to the cooling space. By applying a heat balance, it can be shown that, under the temperature conditions assumed, for every B. T. U. of heat transferred from the heating to the cooling space, two B. T. U.'s of heat will be transferred from the refrigerating space to the cooling space. This ratio, however, can be increased or decreased by suitably changing the end temperatures of the heat differentials. If $Q_h$ represents the heat quantity transferred from the heating space to the cooling space, $T_h$ and $T_{h-}$ the end temperatures of the heat differential through which the fluid is passed, $Q_1$ the heat quantity transferred from the refrigerating space to the cooling space, and $T_1$ and $T_{1+}$ the end temperatures of the heat differential through which the latter fluid is passed, then the heat transformation in accordance with the well-recognized laws of thermodynamics may be expressed by the following formula:

$$\frac{Q_h}{T_h} \times (T_h - T_{h-}) = \frac{Q_1}{T_1} \times (T_1 - T_{1+}).$$

From the foregoing it becomes apparent that by means of a small heat quantity undergoing a wide temperature change, a large heat quantity may be made to undergo a smaller temperature change in the reverse direction inductively. Furthermore, inasmuch as such heat transformations are reversible, by means of a large heat quantity undergoing a small temperature change, a small heat quantity may be made to undergo a large temperature change in the reverse direction inductively. These heat transformations will occur irrespective of the positions of said differentials on the absolute temperature scale. Consequently, by the use of a cooling medium at normal temperatures, such as air or water at their usual temperature, a small heat quantity passed through a relatively large temperature change may be made to induce from such normal heat sources heat changes involving relatively large quantities of heat to produce moderate heating or cooling effects, as desired.

In describing the apparatus of Fig. 3, the temperature $T_{h-}$ has been assumed to be equal to the temperature $T_{1+}$ and a common cooling jacket is shown for the intermediate points of displacement of the two portions of the operating fluid. But from the general law of heat transformation it will be recognized that this is by no means essential, and that said temperatures $T_{h-}$ and $T_{1+}$ may be selected with a considerable difference therebetween to suit any desired conditions. In such case, however, the heat transformer would preferably be divided into two sections with separate cooling jackets for the intermediate-temperature spaces in the transformer. Furthermore, in the above description it has been assumed, for the sake of simplicity, that there is perfect conductivity between the fluid within the free spaces of the cylinder 4 and the walls of said cylinder. In practice any suitable means may be employed for so bringing the operating fluid into intimate contact with the walls of the cylinder as to approximate substantially instantaneous heat-interchange therebetween; thus deflectors might be used that would throw the fluid against the cylinder walls as it leaves the regenerators.

Referring to Fig. 4, a heat transformer is shown which is divided into a high temperature inductor 22 and a low temperture inductor 23 in communication through conduit 22'. Inductor 22 is provided with a piston 24, having a central passage constituting a heat regenerator 25, and with a heating jacket 26 and a cooling jacket 27. Heat may be supplied to the former by any suitable means, as by a gas jet 28, vent holes 28' being employed for the escape of the heating gases. Inductor 23 is similarly provided with a transformer piston 29 having a heat regenerator, as heretofore described, in a central passage, and with a refrigeration jacket 30 and a cooling jacket 31. Pistons 24 and 29 are respectively connected with pistons in operating cylinders 32 and 33, to which any suitable working fluid, as water, steam, compressed air, etc., is conveyed through supply pipes 34, and from which said fluid is exhausted through exhaust pipes 35. Admission and exhaust of the working fluid to and from cylinders 32 and 33 are controlled by the valves diagrammatically represented at 36 and 37. Valves 36 and 37 may be operated by any suitable valve gears, that illustrated being of the type commonly employed in duplex pumps wherein the movement of one piston controls the valve gear of the other piston. The valve gears as shown comprise bell-cranks 38 and 39 connected respectively with valves 36 and 37, and operating rods 40 and 41 connected respectively with said bell-cranks 38 and 39. Each of the piston rods 42 and 43 carries a collar 44 adapted to engage and operate an extension 45 on the corresponding operating rod 40 or 41. In the embodiment illustrated the pistons within the cylinders 32 and 33 are single-acting, the pressure developed within the transformer cylinders being employed to return the transformer pistons 24 and 29 to the upper or inner ends of their strokes.

In operation, valve 36 admits operating fluid to cylinder 32, forcing the piston therein downward or outward, as shown in Fig. 4, and causing the corresponding transformer piston 24 to descend or move outwardly. At the end of the stroke collar 44 operates rod 40 and bell-crank 39, to move valve 37 to fluid-admitting position, and transformer piston 39 is moved downward or outward. During this movement, piston 24 remains at the lower or outer end of its stroke. As piston 29 reaches the lower or outer end of its stroke, collar 44 on piston rod 43 operates rod 41 and bell-crank 39 to move valve 36 to exhaust position. Thereupon the unbalanced pressure on piston 24, owing to the difference in operative areas of the two ends of the piston due to the presence of the piston rod, produces movement of said piston 24 upward or inward. At the end of its upward or inward stroke, valve 37 is similarly moved to exhaust position, and piston 29 moves to the upward or inward end of its stroke. As each of the pistons is stationary while the other piston is moving, the phases occurring in the transformer are substantially as outlined in connection with the construction shown in Fig. 2.

A cooling medium, as water or air, may be supplied to jackets 27 and 31, and any desired refrigerating medium may be circulated through jacket 30. On the other hand, the transformer may be used for the purposes of heating, in which case, the medium at normal temperature, such as water or air, is circulated through jacket 30 while the medium suitable for heating purposes, which may also be water or air, is circulated through jacket 31 where its temperature is raised above normal by the heat effects induced by the primary heat changes. In the latter case the medium in jacket 31 may also pass through jacket 27 to avail of the heat given off at the low-temperature end of the high temperature inductor, and, if desired, said medium may be further heated by the waste gases given off by the source of heat. Where the heat transformer of Fig. 4 is to be operated with an appreciable temperature difference between the low-temperature end of the high temperature inductor and the high-temperature end of the low temperature inductor, the conduit 22′ connecting said inductors is preferably provided with a small regenerator which in operation assumes a temperature gradient in accordance with the temperatures of the respective inductor ends with which it communicates. In this manner tendency toward temperature equalization or heat dissipation is prevented.

It is apparent that the movement of the transformer pistons may be accomplished in any suitable way. The motive means may be electrical, mechanical, hydraulic, pneumatic, etc., or it is even possible to utilize the pressure fluctuations which take place in the transformer cylinders to furnish the small amount of power requisite for moving the transformer pistons. Thus in Fig. 4 the piston rods might be connected to 90° cranks on a common crank-shaft provided with a fly-wheel, and the transformer rendered automatic by a proper selection of piston rod sizes so as to establish the requisite unbalanced pressure upon each piston.

In place of providing the free spaces within a cylinder of high heat conductivity wherein the heating and cooling also take place, the free spaces may be provided in containers of low heat conductivity, and the heating and cooling take place in suitably provided means exterior thereto. Thus in the modification of Fig. 5, a container 46 of low heat conductivity is in communication at its opposite ends through conduits 47 and 48 with a heater 49 and a cooler 50, respectively. The spaces within said heater and cooler are in communication through a regenerator 51. Heater 49 may be maintained at the requisite temperature by any desired means, a gas burner 52 being illustrated and the jacket of said heater being provided with vent holes 53 as shown. Cooler 50 may be supplied with any suitable cooling medium, the jacket thereof being shown with inlet and outlet pipes 54. For displacing the air, a reversible rotary fan or impeller 55 is shown in the lower part of cylinder 46 and adapted to be driven by an operating shaft 56. If desired, a reciprocating piston might be employed instead. Cylinder 46 is in pressure-interchanging relation with a second cylinder or inductor of similar construction through conduit 57. The rotation of the respective fans is so timed that, after cylinder 46 is filled with heated air drawn through heater 49 during phase one, rotation of fan 55 ceases until phase two has taken place in the low temperature inductor. Thereupon fan 55 is rotated in the opposite direction until the heated air is returned through heater 49, regenerator 51 and cooler 50, and is displaced by the cool air entering the cylinder 46 through pipe 48. Thereupon fan 55 is again stationary, while phase four takes place in the low temperature inductor.

The construction illustrated in Fig. 5 possesses certain advantages over that heretofore described, among which it may be noted that the heat transformations therein are adiabatic. The nature of the heat transformations in the several phases closely follow, however, those heretofore described in connection with the structure illustrated in Fig. 2.

Referring to Figs. 6 and 7, a rotary heat transformer is shown as comprising a high temperature rotor 58 and a low temperature rotor 59 mounted upon a common shaft 60. Rotor 58 is provided with a plurality of high temperature inductors, each consisting of a cylinder 61 having therein a piston 62 provided with a regenerator 63 in a central passage therethrough, as heretofore described. Rotor 59 is similarly provided with a corresponding number of low temperature inductors, each comprising a cylinder 64 having therein a piston-regenerator 65 as illustrated. Each high temperature inductor is connected to its corresponding low temperature inductor by a conduit 66, the inductors of each pair being positioned at angles of 90° apart. The inner ends of inductor cylinders 61 are inclosed in a housing 67, and the inner ends of inductor cylinders 64 are inclosed in a housing 67'. The outer ends of all of the inductor cylinders are exposed to a suitable cooling medium, such as air, which serves as the cooling medium for the high temperature inductor and as a cooling or a heating medium for the low temperature inductor, as the case may be. Any suitable means may be provided for supplying heat to the high temperature ends of the high temperature inductors. As illustrated, shaft 60 is provided with an axial passage 68 communicating with a fuel pipe 69, and with air supply apertures 70 as shown. Axial passage 68 is in communication with a plurality of burners 71, one or more for each of the high temperature inductor cylinders 61. The heating gases from burners 71 pass outwardly through housing 67 and then flow inwardly through passages 72 and outwardly through passages 73 in heat-interchanging relation with the air flowing inwardly to the burners through passages 74. In this manner the heating gases give off the greater amount of their unused heat to the heat-conducting walls of said passages, pre-heating the incoming air and leaving the apparatus at substantially normal temperature. If desired, centrifugal force may be utilized in assisting the flow of this air in the proper direction. In the apparatus shown, wall 75 of conduits 74 is stationary and is provided with stationary baffles 74' to prevent the incoming air from taking part in the rotation of the rotor. As the incoming air leaves passages 74 and flows into passages 76 in communication with the burner spaces, it is thrown into rotation by revolving baffles moving with the rotor. Housing 67' of the low temperature rotor receives air through intake 77, and after flowing through the chamber surrounding the inner ends of inductor cylinders 64, it is discharged through out-take 78, baffles 79 being desirably provided to prevent rotation of the air with the rotor as it flows inwardly toward the axis of the rotor, and to transform the rotary motion into a radial motion to maintain a forced circulation.

The transformer pistons 62 and 65 have a sliding fit within their respective cylinders, and the operation is such that they overcome centrifugal force and move by gravity in the manner to be described in connection with the diagrams of Fig. 7. As the members of each pair of inductors are at angles of 90° apart, it will be apparent that when either member of a pair is in motion, the other member thereof is stationary, whereby the ideal heat transforming conditions are maintained as described in connection with the structure of Fig. 2.

Referring to Fig. 7, the corresponding positions successively assumed by both pistons of a heat transformer pair are diagrammatically illustrated at A, B, C, D, E, F, G and H. During the first 90° of rotation the high temperature inductor piston moves from the heating end as shown at A to the cooling end as shown at C, while the low temperature inductor piston remains stationary, as shown in positions A to C. During the next 90° of rotation the high temperature inductor piston remains stationary, as shown in positions C to E, while the low temperature inductor piston moves from its low temperature end, as shown at C, to its high temperature end as shown at E. During the following 90° of rotation the high temperature inductor piston returns from the low temperature end as shown at E to the high temperature end as shown at G, while the low temperature inductor piston remains stationary, as indicated in positions E to G. During the last 90° of rotation, the high temperature inductor piston remains stationary, as shown in positions G to A, while the low temperature inductor piston returns to the low temperature end of its cylinder as shown at A. It will accordingly be noted that the phases occurring in this construction are identical with those occurring in the construction illustrated in Fig. 2.

The construction of Fig. 6 possesses many advantages, among which it may be noted that the operating fluid in the transformer cylinders may be hermetically sealed therein, owing to the absence of piston rods or shaft packings and the availing of gravity as the moving means for the transformer pistons. Thereby an initial charge of fluid may be given the inductors which will serve for an indefinite period without loss by leakage.

If the rotary transformer be operated in the opposite direction from that indicated by the arrow in Fig. 7 and air at normal temperature be received through intake 77, said air will have its temperature raised and will leave the rotor through out-take 78 in heated condition. In such event the surrounding air will operate as the refrigerating medium at the low temperature end of the low temperature inductor. Obviously, air having an initial temperature above or below normal may be introduced through intake 77, and it will have its temperature increased or decreased in accordance with the direction of rotation of the rotors, as heretofore explained.

While several different constructions, by which the process of the present invention may be carried out, have been illustrated and described in detail, it is to be expressly understood that the invention is by no means restricted to performance in apparatus of the types disclosed. All known methods of moving fluid by means of reciprocating or semi-rotary pistons, positive blowers, fans, turbines, ejectors, etc., may be used in moving the air to and from its different positions in the heat transformer, and the energy required for such movement and displacement of the air may be furnished in any suitable way by the internal pressure-impulses of the heat transformation, or by any other suitable form of energy, such as heat, electricity, gravity, magnetism, etc. Furthermore, when the transformer is divided into two sections, the sections may be made of different sizes as well as of the same size as shown. Furthermore, where a considerable temperature change is to be secured, a plurality of transformers may be connected in series.

It will be understood that it is within the contemplation of this invention to protect by heat insulation such parts as are exposed to undesirable heat losses, heat gains, or heat equalizations, all description of such insulation having been intentionally omitted for the sake of clearness. Furthermore, while air has been referred to as an operating fluid in the transformer cylinders, it is to be expressly understood that the invention is in no way restricted to the use of such an operating fluid, but may be any suitable gas or vapor, whether saturated or unsaturated, or may be any suitable mixture of gases and vapors and liquids, or a mixture of any two of them. The manner of employing the heating, cooling and refrigerating media may also be widely varied, and any suitable medium, whether solid, liquid or gaseous, may be employed.

It will therefore appear that a method and apparatus has been devised whereby secondary heating or cooling effects may be induced by primary heat changes, utilizing the heating or cooling effects induced to build up the temperature of a heating medium or to decrease the temperature of a refrigerating medium; that the heating or cooling effects induced are reversible, whereby small heat quantities passing through wide temperature ranges may induce a transformation through narrow temperature ranges of large heat quantities, or vice versa; and that a simple and efficient method and simple and efficient apparatus have been devised for utilizing said secondary induced heating and cooling effects.

What is claimed is:—

1. The method of obtaining useful temperature-effects, which consists of confining a fluid within inclosed communicating spaces, and then alternately heating and cooling one portion of the fluid and thereby inducing secondary heat and cold respectively in other portions of the fluid, while separately abstracting the induced secondary heat or the induced secondary cold.

2. The method of obtaining useful temperature-effects, which consists of confining a body of suitable fluid within communicating inclosed spaces, subjecting the fluid within one space to alternating primary heat-changes and thereby inducing alternate secondary heat-changes in the fluid within the other space, and then subjecting a suitable medium to the temperature-influence of said second space and thereby abstracting the induced temperature-effects.

3. The method of obtaining useful temperature-effects, which consists of producing a succession of alternating primary heat-changes in a portion of confined fluid and thereby causing a succession of alternating pressure-variations in another portion of said fluid and thus producing attendant alternate variations of induced heat in that other portion, and then abstracting one of said induced temperature-effects such as heat and thereby building up increments of the other induced temperature-effect such as cold.

4. The method of obtaining useful temperature-effects, which consists of applying heat-changes to a relatively-small portion of fluid confined within an inclosed space in pressure-interchanging relation with a relatively-large portion of inclosed fluid, thus causing changes of volume of the first-named portion of fluid and thereby inducing secondary heat-changes in the second-named portion of fluid, and then abstracting the induced temperature-effects.

5. The method of obtaining useful heat-effects, which consists of alternately applying heat and cold to a relatively-small portion of fluid confined within an inclosed space in pressure-interchanging relation with a relatively-large confined portion of fluid, thus causing alternate changes of volume of the first-named portion of fluid and thereby inducing secondary heat-changes in the second-named portion of fluid, and then abstracting the induced temperature-effects.

6. The method of obtaining useful temperature-effects, which consists of subjecting alternately two portions of a confined fluid to primary heat-changes under different temperature-conditions, and abstracting the secondary heat or cold effects thereby induced.

7. The method of obtaining useful temperature-effects, which consists of subjecting alternately two fluids in pressure-interchanging relation to primary heat-changes under different temperature-conditions, and abstracting the secondary heat or cold effects thereby induced.

8. The method of obtaining useful temperature-effects, which consists of transferring heat by means of heat-induction from a relatively-hot to a relatively-cold body, and thereby inducing a heat-transfer from another relatively-cold body to another relatively-hotter body.

9. The method of obtaining useful temperature-effects, which consists of transferring a heat-quantity by means of heat-induction from a relatively-high to a relatively-low temperature-source, and thereby inducing a larger heat-quantity to be transferred from a relatively-low to a relatively-higher temperature-source.

10. The method of obtaining useful temperature-effects, which consists of producing primary heat-changes in a fluid and thereby inducing secondary heat-changes, and then abstracting separately the heating and cooling effects induced by said secondary changes.

11. The method of obtaining useful temperature-effects, which consists of producing primary heat-changes in a fluid and thereby inducing secondary heat-changes, and then subjecting a suitable medium to the heating or cooling effects of said secondary changes and thereby abstracting said induced effects.

12. The method of obtaining useful temperature-effects, which consists of producing primary heat-changes in a body of fluid and thereby inducing secondary heat-changes in another body of fluid in communication therewith, and then abstracting the heating or cooling effects of said second body.

13. The method of obtaining useful temperature-effects, which consists of producing primary heat-changes in a body of fluid and thereby inducing secondary heat-changes in another body of fluid in communication therewith, and then subjecting two separate mediums to the temperature-effects of said secondary changes and thereby separately abstracting said induced heat and cold.

14. The method of obtaining useful temperature-effects, which consists of producing primary heat-changes in a relatively small volume or body of fluid and thereby inducing secondary heat-changes in a relatively large volume of fluid in communication therewith, and then abstracting the induced heating or cooling from the last-named body of fluid.

15. The method of obtaining useful temperature-effects, which consists of applying heat or cold to a body of fluid confined in a relatively-small space and thereby inducing secondary heat-changes in another body of fluid confined within a relatively large space in pressure-interchanging relation to said small space, and then abstracting said induced temperature-effects.

16. The method of obtaining useful temperature-effects, which consists of applying heat or cold to a body of fluid confined within a relatively small space and thereby inducing secondary heat-changes in another body of fluid confined within a relatively large space in pressure-interchanging relation with said small space, and then subjecting a suitable medium to the induced secondary heat or cold of said second body of fluid and thereby abstracting said induced temperature-effects.

17. The method of obtaining useful temperature-effects, which consists of subjecting a fluid to primary heat-changes, and cumulatively inducing therefrom a temperature-differential in another body of fluid, and abstracting the temperature-effects obtained by such cumulation.

18. The method of obtaining useful temperature-effects, which consists of subjecting a fluid to primary heat-changes and thereby inducing secondary heat-changes, building up a heat-differential by the repetition of the steps, and abstracting the temperature-effects obtained by such building-up.

19. The method of obtaining useful temperature-effects, which consists of subjecting a fluid to primary heat-changes and thereby inducing secondary heat-changes, building up a temperature-differential by the repetition of the steps, and subjecting a suitable medium to the effects of said induced differential and thereby abstracting the induced temperature-effects.

20. The method of obtaining useful temperature-effects, which consists of alternately heating and cooling a fluid and thereby inducing secondary heat-changes in another body of fluid in communication therewith, and abstracting the temperature-effects from the latter body.

21. The method of obtaining useful temperature-effects, which consists of alternately heating and cooling a fluid and thereby inducing secondary heat-changes in another body of fluid in communication therewith, and subjecting a suitable medium to the induced heating or cooling effects of the latter body and thereby abstracting said induced heat or cold.

22. The method of obtaining useful temperature-effects, which consists of alternately heating and cooling a fluid confined within a relatively small space and thereby inducing secondary heat-changes in another body of fluid confined within a relatively large space in communication with said small space, accumulatively inducing a heat-differential by repeating the steps, and subjecting a suitable medium to the heating or cooling effects obtained in the building up of said differential and thereby abstracting said induced temperature-effects.

23. The method of obtaining useful temperature-effects, which consists of alternately subjecting a confined body of fluid to the opposite end-temperatures of a heat-differential and thereby inducing secondary heating or cooling effects in another body of fluid in communication therewith, and then abstracting said induced temperature-effects.

24. The method of obtaining useful temperature-effects, which consists of alternately applying the opposite end-temperatures of a heat differential to a body of fluid confined within a relatively small space and thereby inducing secondary heating or cooling effects in another body of fluid confined within a relatively large space in communication with said small space, and abstracting said induced temperature-effects.

25. The method of obtaining useful temperature-effects, which consists in applying heat-changes to a fluid in one of two communicating inclosed spaces of different volume and thereby inducing secondary heat-changes in the fluid within the other inclosed space, and then abstracting the induced temperature-effects from the latter.

26. The method of obtaining useful temperature-effects, which consists of transferring a body of fluid to and from a source of heat while in communication with another body of fluid and thereby inducing secondary heat-changes in the latter body, and then abstracting said induced temperature-effects.

27. The method of obtaining useful temperature-effects, which consists of transferring an inclosed body of fluid alternately between sources of different temperature while in pressure-interchanging relation with another inclosed body of fluid, and thereby inducing secondary heat-effects in the second body, and passing a suitable medium in temperature-interchanging relation with the latter body and thereby abstracting the induced temperature-effects thereof.

28. The method of obtaining useful temperature-effects, which consists of transferring a body of fluid alternately between sources of different temperature, while transferring alternately between different points a second body of fluid in pressure-interchanging relation with the first-named body of fluid, the last-named transfer being in such timed relation to the transfers of the first-named body of fluid as to induce different temperature-conditions at said points, and subjecting a suitable medium to heat-interchange with said second body of fluid at one of said points.

29. The method of obtaining useful temperature-effects, which consists of transferring a body of fluid alternately through a regenerator between sources of different temperature, thereby inducing secondary heating or cooling effects in fluid in pressure-interchanging relation therewith, and abstracting said secondary heating or cooling effects.

30. The method of obtaining useful temperature-effects, which consists of transferring a body of fluid alternately through a regenerator between sources of different temperature, and transferring a second communicating body of fluid alternately through a second regenerator in such timed relation to the transfers of said first body of fluid as to induce a heat differential at opposite ends of said second regenerator, and abstracting the temperature-effects of either end of the second regenerator.

31. The method of obtaining useful temperature-effects, which consists of transferring a body of fluid alternately between sources of different temperature, and transferring a second body of fluid in pressure-interchanging relation with said first body of fluid alternately through a regenerator in such timed relation to the transfers of said first body of fluid as to induce a heat differential at opposite ends of said regenerator, and abstracting the temperature-effects of either end of said regenerator.

32. In combination, means to subject a body of fluid to primary heat-changes, means to induce by said changes secondary heat-changes in another body of fluid in pressure-interchanging relation with the first-named body, and means to abstract the induced temperature-effects.

33. In combination, means to subject a body of fluid alternately to heating and cooling influences, means to induce from said changes secondary heat-changes in another body of fluid in pressure-interchanging relation with the first-named body, and means to abstract the induced temperature-effects.

34. In combination, means to subject a body of fluid to primary heat-changes, means to subject another body of fluid in pressure-interchanging relation therewith alternately to the secondary heating and cooling effects induced by said primary heat-changes, and means to abstract the heating or cooling effects from said body.

35. In combination, means to subject a body of fluid to primary heat-changes, means to induce from said changes secondary heat-changes in another body of fluid in pressure-interchanging relation with the first-named body, means to subject the last-named fluid to and remove it from temperature-interchanging relation with a medium adapted to abstract the induced temperature-effects.

36. In combination, means to displace a body of fluid alternately between sources of different temperature, means to induce thereby secondary heat-changes in another body of fluid in pressure-interchanging relation with the first-named body, and means to abstract the induced temperature-effects.

37. In combination, fluid containers of different volume in communication with each other, means to subject the fluid in one of said containers to heat changes, means to induce thereby secondary heat-changes in the fluid in another of said containers, and means to abstract the heating or cooling effects thereby induced in the fluid in the other of said containers.

38. In combination, means to alternately subject a fluid to heating and cooling influences, means to subject fluid in pressure-interchanging relation therewith alternately to the secondary heating and cooling effects induced by the primary heat changes, and means to abstract separately from the last-named fluid the secondary heat or cold thus induced.

39. An apparatus for obtaining useful temperature-effects, which consists of the combination of means for confining a fluid within inclosed communicating spaces, means for alternately heating and cooling one portion of the fluid, and means for separately abstracting from other portions of the fluid the secondary heat or the secondary cold induced therein by the primary heating and cooling aforesaid.

40. An apparatus for obtaining useful temperature-effects, which consists of the combination of means for confining a fluid in two or more portions having pressure-interchanging relation with each other, means for alternately heating and cooling one portion of said fluid and thereby producing corresponding pressure-changes and attendant secondary heat-changes in other portions of the fluid, means for removing from the last-named portions of the fluid one of the two opposite secondary heat-effects thus induced and thereby building up the increments of the other secondary heat thus induced, and means for abstracting the built-up temperature-effects last named.

41. In combination, means to displace a fluid alternately between sources of different temperature, and means to displace a fluid in pressure-interchanging relation therewith alternately into and out of heat-interchanging relation with a medium adapted to abstract the heating or cooling effects induced by the primary heat changes.

42. In combination, means to displace a fluid alternately between sources of different temperature, means to displace fluid in communication therefrom alternately to and from different positions, and means to abstract the heating and cooling effects induced in said last-mentioned fluid, in its different positions, by the primary heat changes.

43. In combination, means to displace a fluid alternately between two positions, means to subject said fluid to heating and cooling influences respectively in said two positions, means to displace fluid in pressure-interchanging relation with said first-mentioned fluid alternately between two positions, and means to abstract the heating and cooling effects induced in said last-mentioned fluid, in its different positions, by the primary heat changes in said first-mentioned fluid.

44. In combination, means to displace a fluid alternately between sources of different temperature, a regenerator through which said fluid is passed during its displacement, and means to abstract from fluid in pressure-interchanging relation therewith the secondary heating or cooling effects induced by the primary heat changes.

45. In combination, means to subject a fluid to primary heat changes, means to displace fluid in pressure-interchanging relation therewith alternately into and out of heat-interchanging relation with a medium adapted to abstract the heating or cooling effects induced in said second-mentioned fluid by the primary heat changes, and a regenerator through which the last-mentioned fluid is passed during its displacement.

46. In combination, means to display a fluid alternately between sources of different temperature, a regenerator through which said fluid is passed during its displacement, means to displace fluid in pressure-interchanging relation with said first-mentioned fluid alternately into and out of heat-interchanging relation with a medium adapted to abstract the heating or cooling effects induced in said second-mentioned fluid by the primary heat changes, and a second regenerator through which the last-mentioned fluid is passed during its displacement.

47. In combination, means to displace a fluid alternately between two positions, means to subject said fluid to heating and cooling influences respectively in said two positions, a regenerator through which said fluid passes in being displaced from one position to the other, means to displace fluid in pressure-interchanging relation with said first-mentioned fluid alternately between two positions, and means to abstract the heating and cooling effects induced in said last-mentioned fluid in its different positions by the primary heat changes in said first-mentioned fluid.

48. In combination, means to displace a fluid alternately between two positions, means to subject said fluid to heating and cooling influences respectively in said two positions, means to displace fluid in pressure-interchanging relation with said first-mentioned fluid alternately between two positions, a regenerator through which said last-mentioned fluid passes in being displaced from one position to the other, and means to abstract the heating and cooling effects induced in said last-mentioned fluid, in its different positions, by the primary heat changes in said first-mentioned fluid.

49. In combination, means to displace a fluid alternately between two positions, means to subject said fluid to heating and cooling influences respectively in said two positions, a regenerator through which said fluid passes in being displaced from one position to the other, means to displace fluid in pressure-interchanging relation with said first-mentioned fluid alternately between two positions, a regenerator through which said last-mentioned fluid passes in being displaced from one position to the other, and means to abstract the heating and cooling effects induced in said last-mentioned fluid, in its different positions, by the primary heat changes in said first-mentioned fluid.

50. The method of obtaining useful temperature-effects, which consists of applying primary heating and cooling alternately to a portion of a confined body of fluid and thereby inducing secondary heat-changes in another portion of said confined fluid, simultaneously causing said first-named portion of fluid to impart heat to and abstract heat from a regenerator, meanwhile causing said last-named portion of fluid to abstract heat from and impart heat to another regenerator, and ultimately abstracting separately the secondary heat or the secondary cold thus developed through the last-named portion of fluid.

In testimony whereof I have signed this specification.

RUDOLPH VUILLEUMIER.